United States Patent Office 3,075,904
Patented Jan. 29, 1963

3,075,904
IRRADIATED POLYMERS
Gaetano F. D'Alelio, 2011 E. Cedar St., South Bend, Ind.
No Drawing. Filed Jan. 6, 1958, Ser. No. 707,080
13 Claims. (Cl. 204—154)

This invention relates to improvements in linear, aliphatic, saturated polymeric esters. More specifically, it relates to the irradiation of such compositions, sometimes hereinafter referred to as "polymers" or "polymeric materials," in the presence of polyunsaturated modifiers, as defined hereinafter and sometimes herein referred to as "modifier," and improved products obtained thereby.

In the past there have been certain limitations in the properties of saturated polymeric ester resins. In order to have solubility and low melting characteristics desirable for application of such resins for many purposes, such as coatings or shaped articles, it has been necessary to sacrifice somewhat the solvent resistance and high melting point or heat resistance desired in finished articles made from these resins. Attempts have been made to effect improvements in such desired properties by incorporating in the resins substituents having unsaturation of a nature which might cause crosslinkages by post-treatment after application or shaping of the resin. However, difficulty in controlling the amount and the timing of such crosslinking and increased tendency of such materials to discolor have left much to be desired in that practice.

In accordance with the present invention, it has been found, however, that linear, aliphatic, saturated polymeric esters can be irradiated in intimate contact with polyunsaturated modifiers, as defined hereinafter to give products having improved properties, such as greater solvent and heat resistance and better strength characteristics than the original polymer had. Furthermore, these irradiated products can be hydrolyzed or saponified to give materials or monomeric units different from those of which the polyester resins were originally constituted.

The polyunsaturated modifiers used in the practice of this invention are polyalkenyl aryl compounds having the formula:

$$CH_2=CR—(CRR)_n—Ar—(CRR)_{n'}—CR=CH_2$$

wherein the various R groups can be similar or different radicals selected from the class consisting of hydrogen, and methyl and ethyl groups; $n$ and $n'$ can each have values of 0, 1 or 2; and Ar is an aryl nucleus such as phenylene, naphthylene, and diphenylene on which substituents other than those indicated above can also be present so long as they do not have an unfavorable influence on the irradiation. Such substituents include alkyl, cycloalkyl, aryl, alkoxy, aryloxy, chloro, fluoro, bromo, carbalkoxy, acyloxy, cyano groups, etc., as well as additional alkenyl groups including the types indicated in the formula.

These improvements are most surprising in view of the fact that the polyalkenyl aryl compounds are noted for their strong tendency to polymerize themselves. It might be expected, therefore, that irradiation of mixtures containing such compounds would result in the formation of homopolymers thereof, which would be dispersed heterogeneously in the polymeric esters.

It has been found, in accordance with this invention, that comparable or higher degrees of crosslinking can be effected in the polymers with lower irradiation doses in the presence of the polyunsaturated modifiers. Furthermore, polymers irradiated without these modifiers are more brittle and stiffer than polymers irradiated with these modifiers.

The linear, saturated aliphatic polyesters used in the practice of this invention can advantageously be prepared from dihydroxy alkanes, such as ethylene glycol, and dicarboxylic aliphatic acids, such as succinic acid, or from aliphatic compounds containing an hydroxy and carboxylic acid group in the same molecule. While the dihydroxy and dicarboxylic compounds are advantageous in the preparation of linear polyesters, it is possible and very often desirable to use other polyhydric alkanes and other polycarboxylic aliphatic acids in quantities or under conditions which give polymers which are not substantially crosslinked. For example, glycerine can be used in such amounts or under conditions controlled so as to give very little or no crosslinking. Thus succinic acid or anhydride can be reacted with less than the stoichiometric amount of ethylene glycol. Then, when the esterification reaction is substantially completed, glycerine can be added in such a calculated amount that only two hydroxy groups of the glycerine can enter the reaction to complete esterification with the free carboxylic acid groups in the reaction mixture. Furthermore, polyhydric and polycarboxylic aliphatic compounds of the type indicated can be partially esterified so that there are substantially only two hydroxy or carboxylic acid groups available to participate in the polymerization reaction. Thus, the monostearate of glycerine, or the dicaproate of pentaerythritol, or the monohexyl ester of tricarballylic acid can be used.

Methods of preparing the polyesters are well known in the art. The acids and the glycols, or the hydroxy acids, can be used in these preparations, or where desirable or advantageous various derivatives, such as the esters, anhydrides, acid chlorides, etc., can be used. Generally, for high molecular weight polyesters it is necessary or desirable to conduct the esterification under reduced pressures.

It has been noted that polymers having molecular weights greater than about 6,000 can easily be converted to insoluble products in accordance with the practice of this invention. With polymers of lower molecular weight, it is necessary to expose them to correspondingly greater amounts of irradiation to reach the insoluble stage. However, it is contemplated that irradiation treatment of such lower molecular weight polymers for other purposes as described hereinafter, for example 3,000 and even lower, is within the scope of this invention, even though the irradiation is not carried on far enough to effect insolubility. For such lower molecular weight polymers a considerable amount of the preliminary irradiation apparently is directed to increasing linear polymer chains, or in changing the type of polymer linkage. After the linear polymer length has reached a certain amount or type, the joining together of polymer chains apparently results in the crosslinking which effects insolubility. It is also possible that there is a certain amount of decomposition of polymer chains effected by the irradiation resulting in a reduction of molecular weights, which is competitive with the increase of molecular weights caused by tying polymer chains together by irradiation. However, this invention is not considered as restricted to any such theories or explanations, and the scope of the invention is contemplated as herein described and claimed.

It has also been noted that irradiation of the polymers in the presence of the polyunsaturated modifiers as described herein is much more effective in producing crosslinking of polymer chains, and thereby improvement of properties as above noted, than is the case when the polymers are irradiated in the absence of these polyunsaturated modifiers. Furthermore, there is less side reaction, such as degradation and discoloration, when these modifiers are used.

Polyalkenyl aryl compounds which can be used in the practice of this invention include; divinyl benzene, trivinyl benzene, divinyl naphthalene, trivinyl naphthalene, divinyl diphenyl, trivinyl diphenyl, divinyl toluene, trivinyl toluene, divinyl xylene, divinyl anisole, divinyl ethyl benzene, divinyl chlorobenzene, divinyl methylnaphthalene, divinyl ethylnaphthalene, divinyl methyldiphenyl, divinyl ethyldiphenyl, divinyl ethoxy naphthalene, divinyl chloronaphthalene, divinyl chlorodiphenyl, divinyl ethoxy diphenyl, vinyl isopropenyl benzene, vinyl isopropenyl naphthalene, vinyl isopropenyl diphenyl, vinyl isopropenyl toluene, vinyl isopropenyl anisole, vinyl isopropenyl chlorobenzene, vinyl isopropenyl methoxy napthalene, vinyl isopropenyl chloronaphthalene, vinyl isopropenyl methyl chloronaphthalene, vinyl isopropenyl chlorodiphenyl, vinyl isopropenyl methoxy diphenyl, vinyl isobutenyl benzene, vinyl isobutenyl naphthalene, vinyl isobutenyl diphenyl, vinyl allyl benzene, vinyl allyl naphthalene, vinyl allyl diphenyl, vinyl allyl toluene, vinyl allyl anisole, vinyl allyl methylnaphthalene, vinyl allyl chlorodiphenyl, diallyl benzene, triallyl benzene, diallyl naphthalene, triallyl naphthalene, diallyl diphenyl, triallyl diphenyl, diallyl toluene, diallyl xylene, diallyl chorobenzene, diisopropenyl benzene, diisopropenyl naphthalene, diisopropenyl diphenyl, diisopropenyl toluene, diisopropenyl anisole, diisopropenyl methyl naphthalene, diisopropenyl chlorodiphenyl, dimethallyl benzene, dimethallyl naphthalene, dimethallyl diphenyl, bis-(alpha-ethyl-ethenyl)-benzene, bis-(alpha-ethyl-ethenyl)-naphthalene, bis-(alpha-ethyl-ethenyl) - diphenyl, bis-(alpha-vinyl-ethyl)-benzene, bis-(alpha-vinyl-ethyl)-naphthalene, bis-(alpha-vinyl-ethyl)-diphenyl, vinyl (alpha-vinyl-ethyl)-benzene, vinyl (alpha-vinyl - ethyl)-naphthalene, vinyl (alpha-vinyl-ethyl)-diphenyl, etc.

Various methods of preparing polyalkenyl aryl compounds are well known. Divinyl benzene can be prepared in pure form but is available commercially in mixtures containing ethyl styrene. For reasons of economy such mixtures are often used. One such commercial product contains approximately 50 percent divinyl benzene and 50 percent ethyl-styrene; another contains approximately 25 percent divinyl benzene, 50 percent ethyl styrene, and 25 percent diethyl benzene. It is found, however, these components are absorbed in practically the same ratio as they exist in the mixture so that the amount of divinyl benzene absorbed is determined as 50 percent or 25 percent, respectively, of the total amount of such commercial mixtures absorbed.

Divinyl benzene and other dialkenyl aryl compounds of much greater purity can be prepared by dehydrating the corresponding hydroxy compounds, for example, divinyl benzene from alpha, alpha'-dihydroxydiethyl benzene. For purposes of this invention the dialkenyl aryl compound need not be used in pure or concentrated form. Diluents or solvents can be used, especially in cases where it is desirable to aid the absorption of the dialkenyl aryl compound. Where it is desirable to determine the amount of dialkenyl aryl compound actually absorbed from such solutions, this can be calculated from a simple analysis of the dialkenyl aryl compound content of the solution after the polymer material has been immersed therein and removed. In cases where the polymer material is soluble, an inert, mutual solvent can be used or the dialkenyl aryl compound itself can be used as solvent. Such solution can also be used in the practice of the invention.

For most purposes in the practice of this invention it is generally desirable to have in the polyester molecules a higher proportion of methylene or —CH$_2$— groups, or of hydrocarbon portion than ester or —COO— groups. While most of the polyesters shown above are of the more easily available hydroxy and carboxylic acid compounds having a relatively few number of carbon atoms between the esterifiable groups, there is no limitation on the number of carbon atoms which separate the esterifiable or esterified groups. This is determined by the properties desired in the resultant polyesters, the availability of the materials and the sluggishness of such high molecular weight materials to undergo esterification because of the higher proportion of non-esterifiable portions of such materials.

Various hydroxy and carboxylic acid compounds can be used in various combinations of two or more in the preparation of polyesters as indicated herein suitable for the practice of this invention including, but not limited to the following: ethylene glycol, trimethylene glycol, tetramethylene glycol, pentamethylene glycol, hexamethylene glycol, 2,2-dimethylpropanediol-1,3, 3-methylpentanediol-1,4, 2,2-diethylbutanediol-1,4, 4,5-dihydroxy - nonane, heptamethylene glycol, nonamethylene glycol, decamethylene glycol, 3-methylpentanediol-1,5, sebacic acid, azelaic acid, adipic acid, succinic acid, octylsuccinic acid, succinic acids produced by the hydrogenation of condensation products of maleic anhydride with $C_{22}$ and similar olefins, malonic acid, methylmalonic acid, methylsuccinic acid, brassilic acid, glutaric acid, pimelic acid, suberic acid, japanic acid, thapsic acid, etc. Hydroxy aliphatic carboxylic acids which can also be used, either alone, in mixtures of two or more with each other, or in mixtures of glycols and polybasic acids to produce esters for the practice of this invention include, but are not restricted to: omega-hydroxy-decanoic acid, beta-hydroxyisobuteric acid, epsilon-hydroxycaproic acid, hydroacrylic acid, sabinic acid, juniperic acid, jalapinolic acid, etc.

The polymers can be in any suitable form for admixing with, or absorbing, or containing the polyunsaturated modifier. For example, it can be in powder, film, fiber, pellet or solution form, so as to present large areas for absorbing or contacting the modifier. Molded articles can also be so treated. If desired, increased temperatures can be used provided the modifier does not thermally polymerize to an undesirable extent at those temperatures.

If the modifier is in liquid or solution form, the admixture can be performed by absorption. For example, the polymers are allowed to stand in the modifier in liquid or solution form until a desired amount has been absorbed or diffused therein. The amount can be determined by periodically removing the polymers, draining or wiping off the excess liquid and weighing to determine the amount absorbed. Sometimes it may be desirable to allow the so-treated polymers, particularly the more massive structures, to stand for a time sufficient to permit diffusion of the absorbed material to give more uniform distribution throughout the mass of the polymers.

However, the modifier can be introduced in any other convenient or appropriate manner. For example, the mixture can also be effected mechanically as on mixing mills, in a Banbury mixer, or in a single or double worm extruder. Since the heat generated in such latter types of mixing may cause polymerization of the modifier, particularly where the latter is very actively polymerizable, this type of mixing is very often best carried out at reduced temperatures, in the presence of an inert atmosphere, such as nitrogen, and/or in the presence of a polymerization inhibitor, such as 2,6-ditertiary-butyl-paracresol, tertiary-butyl-catechol, etc. Such compounded mixtures can then be extruded as fibers, films, rods, etc., or as wire coatings or coatings on fibrous materials for clotheslines, etc., and then irradiated. They can also be extruded in tubular form, such as pipes, molded into shaped articles, or blown into bottles, and in each case then irradiated.

The term "irradiation," as used herein, means high energy radiation and/or the secondary energies resulting from conversion of this electron energy to neutron or gamma radiation, said electron energies being at least about 100,000 electron volts. While various types of irradiation are suitable for this purpose, such as X-ray and gamma and beta rays, the radiation produced by high power electron linear accelerators has been found to be very conveniently and economically applicable and to give very satisfactory results. However, regardless of the type of irradiation and the type of equipment used for its generation or application, the use thereof in the treatment of polymeric materials as described herein is contemplated as falling within the scope of this invention so long as it is produced by or from electron energy of at least about 100,000 electron volts. While there is no upper limit to the electron energy that can be so applied advantageously, the effects desired in the practice of this invention can be accomplished without having to go above 50,000,000 electron volts. Generally, the higher the electron energy used, the greater is the depth of penetration into the massive structure of polymeric materials, and the shorter is the time of exposure required to accomplish the desired result. For other type of irradiation, such as gamma and X-rays, energy systems equivalent to the above range of electron volts are desirable.

It is intended that the term "irradiation" include what has been referred to in the prior art as "ionizing radiation" which has been defined as radiation possessing an energy at least sufficient to produce ions or to break chemical bonds and thus includes also radiations such as "ionizing particle radiation" as well as radiations of the type termed "ionizing electromagnetic radiation."

The term "ionizing particle radiation" has been used to designate the emission of electrons or highly accelerated nuclear particles such as protons, neutrons, alpha-particles, deuterons, beta-particles, or their analogs, directed in such a way that the particle is projected into the mass to be irradiated. Charged particles can be accelerated by the aid of voltage gradients by such devices as accelerators with resonance chambers, Van de Graaff generators, betatrons, synchrotons, cyclotrons, etc. Neutron radiation can be produced by bombarding a selected light metal such as beryllium with positive particles of high energy. Particle radiations can also be obtained by the use of an atomic pile, radioactive isotopes or other natural or synthetic radioactive materials.

"Ionizing electromagnetic irradiation" is produced when a metallic target, such as tungsten, is bombarded with electrons of suitable energy. This energy is conferred to the electrons by potential accelerators of over 0.1 million electron volts (mev.). In addition to radiations of this type, commonly called X-ray, an ionizing electromagnetic radiation suitable for the practice of this invention can be obtained by means of a nuclear reactor (pile) or by the use of natural or synthetic radioactive material, for example cobalt 60.

Various types of high power electron linear accelerators are commercially available, for example from Applied Radiation Corporation, Walnut Creek, California. In the following Example I, ARCO type travelling wave accelerator, model Mark I, operating at 3 to 10 million electron volts, was used to supply the irradiation. Other type of accelerators, such as supplied by High Voltage Engineering Corporation, Burlington, Massachusetts, or as described in United States Patent No. 2,763,609 and in British Patent No. 762,953 are satisfactory for the practice of this invention.

In the following examples, the radiation doses are reported in megareps, which represent 1,000,000 reps. A "rep" is defined, according to "Reactor Shielding Design Manual," edited by Theodore Rockwell III and published by D. Van Nostrand Company, Inc., 1st edition, 1956, as that radiation dosage which produces energy absorption in human tissue equal to 93 ergs per gram of tissue.

In the practice of this invention, changes in properties of the polymeric materials can often be noted after treatment with even less than 1 megarep. However, it is generally advantageous to use doses of 2 megareps or more. The degree of change in properties is dependent somewhat on the dosage, greater changes being effected by increasing the dosage.

The polymer material to be treated is often advantageously irradiated while in a container made of a material such as aluminum or glass which will not substantially interfere with the irradiation. It is advantageous also to use polymeric materials, such as polyethylene itself, nylons, i.e. 66 nylon, polycaprolactam, etc. It can also be wrapped in film or foil impervious to vapors and gases, such as aluminum foil, polyethylene film, etc., which will prevent substantially the escape of volatile materials. It is often advantageous to avoid oxidation or side reactions by the use of an inert atmosphere such as nitrogen. Moreover, it is advantageous to prevent the temperature from approaching that at which the polymer material is unstable. This can be accomplished by cooling the polymer material before irradiation, for example with Dry Ice, or by dissipating the heat generated during irradiation.

Various methods of practicing the invention are illustrated by the following examples. These examples are intended merely to illustrate the invention and not in any sense to limit the manner in which the invention can be practiced. The parts and percentages recited therein and all through this specification, unless specifically provided otherwise, refer to parts by weight and percentages by weight. Unless indicated otherwise, the terms "polymers" and "polymeric" are intended to include "copolymers" and "copolymeric." Molecular weights given herein are Staudinger molecular weights.

EXAMPLE I

A polyester prepared from ethylene glycol and sebacic acid having a molecular weight of 6,000 and being completely soluble in chloroform, is mixed intimately on a Banbury mixer with 4 percent of divinyl benzene containing 1 part of t-butyl catechol per 100 parts of divinyl benzene. The resulting mixture is divided into a number of samples which are individually wrapped in aluminum foil and given different amounts of irradiation using a high power electron linear accelerator of the following dosages: 5, 10, 25, 50 and 100 megareps respectively. In each case the irradiated product is infusible and is insoluble in chloroform, and is less stiff and less brittle than the same polyester irradiated in the absence of divinyl benzene or other polyunsaturated modifier taught herein.

Various samples of this same polyester similarly treated with divinyl benzene are exposed to $1 \times 10^8$ roentgens each of gamma radiation, X-rays, neutron radiation from bombarded beryllium, radiation from radioactive cobalt 60, and radiation from a Van de Graaff generator. In each case similar improvements of properties are noted.

EXAMPLE II

A polyester prepared from trimethylene glycol and azelaic acid, which has a molecular weight of 10,000 and is completely soluble in chloroform, is treated according to the procedure of Example I and similar improvements with respect to brittleness, stiffness and solvent and heat resistance are noted.

EXAMPLE III

A polyester prepared from tetramethylene glycol and adipic acid, which has a molecular weight of 8,000 and is completely soluble in carbon-tetrachloride, is mixed on a Banbury mixer with 8 percent of a commercial divinyl benzene composition containing 50 percent divinyl benzene and 50 percent of ethylstyrene. Upon treatment of various samples with 5 megareps, 25 megareps, and 50 megareps respectively of irradiation as in Example I, the product is found to be insoluble in carbon tetrachloride, chloroform, and methylene dichloride in each case, is infusible, and is improved with respect to stiffness and brittleness.

EXAMPLE IV

A polyester prepared from pentamethylene glycol and succinic acid anhydride, which has a molecular weight of 12,000 and is completely soluble in chloroform, is divided into powder form, mixed on a mill with 2 percent by weight of diisopropenyl benzene and then extruded into pellets. Samples of these pellets are individually wrapped in polyethylene film and exposed to 5, 10, and 50 megareps of irradiation respectively, in accordance with the procedure of Example I. In each case the irradiated product is insoluble in chloroform, and is infusible.

EXAMPLE V

A polyester prepared from omega-hydroxy-decanoic acid, having a molecular weight of 6,000 and being completely soluble in chloroform, is mixed in powder form on a mill with 5 percent divinyl benzene and then extruded into a thin sheet. Samples of this sheet are individually wrapped in aluminum foil and exposed to 15, 25 and 35 megareps of irradiation respectively in accordance with the procedure of Example I. In each case the irradiated product is insoluble in chloroform, is infusible, and is improved with respect to brittleness and stiffness.

EXAMPLE VI

A number of polyesters made from the various glycols and dibasic acids listed below and as indicated by the key letters in the table given below, were individually mixed with the modifier and in the percentage indicated in the table and then irradiated as, in Example I, with the doses indicated in the table. Prior to irradiation each polyester is soluble in chloroform and is fusible. After irradiation in the doses indicated, the polyester in each case becomes insoluble in chloroform and infusible.

| Glycols | Dibasic Acids | Modifier |
|---|---|---|
| A—2,2-dimethylpropanediol-1,3. | K—Sebacic acid. | S—Divinyl naphthalene. |
| B—3-methylpentanediol-1,4. | L—Azelaic acid. | T—Divinyl diphenyl. |
| C—4,5-dihydroxynonane. | M—Brassilic acid. | U—Diallyl anisole. |
| D—Decamethylene glycol. | N—Octylsuccinic acid. | V—Diisopropenyl chlorobenzene. |
| E—Tetramethylene glycol. | O—Succinic acid. | W—Vinyl isopropenyl naphthalene. |
| F—3-methylpentanediol-1,5. | P—Pimelic acid. | X—Vinyl isobutenyl benzene. |
| G—Hexamethylene glycol. | Q—Adipic acid. | Y—Bis(alpha-vinyl-ethyl)-benzene. |
| H—Ethylene glycol. | R—Hydrogenated condensation product of $C_{22}$ olefin and maleic anhydride. | Z—Triallyl benzene. |

*Table*

| Polyester | Mol. Wt. | Modifier | Percent Modifier | Megareps |
|---|---|---|---|---|
| A—K | 30,000 | S | 2 | 75 |
| B—L | 20,000 | T | 5 | 50 |
| C—M | 10,000 | U | 5 | 40 |
| D—N | 12,000 | V | 5 | 35 |
| E—O | 10,000 | W | 10 | 5 |
| F—P | 15,000 | X | 10 | 2 |
| G—Q | 35,000 | Y | 20 | 10 |
| H—R | 8,000 | Z | 50 | 25 |

In addition to the foregoing modifiers, other materials may be present in minor amounts in the polymeric compositions, added by various well-known means, such as milling, etc. Thus, for example, plasticizers, lubricants, fillers, etc. can be added in accordance with the effects desired. Suitable fillers are silica, silica aerogel, titanium dioxide, calcium silicate, ferric oxide, chromic oxide, cadmium sulfide, asbestos, glass fibers, calcium carbonate, carbon black, lithopone, talc, etc. Furthermore various modifications and improvements in properties can be effected by admixing these polymeric materials with various other resins regardless of whether such other resins are degraded when irradiated by themselves. Even if so degraded, the crosslinking produced by irradiation with polymeric materials as in this invention results in various novel improvements in the polymeric materials. Such other resins include: polyacrylic esters, polystyrene, polyethylene, chlorinated polyethylene, chlorosulfonated polyethylene, natural and synthetic rubbers, butadiene-acrylonitrile copolymers, neoprenes, polydimethylsiloxanes, styrene-acrylonitrile copolymers, polymethyl methacrylate, polyvinyl chloride, polyvinylidene chloride, polytetrafluoroethylene, polychlorotrifluoroethylene, cellulose, polyisobutylene, etc.

An important feature of this invention resides in the fact that the irradiated product can be hydrolyzed or saponified, according to any of the well-known procedures for saponification, to give various polyfunctional products. For example, compounds having a plurality of functional groups can be prepared. Thus, representing parts of various polymeric molecules used herein, with Z representing a crosslinking residue of the polyunsaturated modifier, possible products obtained upon hydrolysis or saponification can be illustrated as follows:

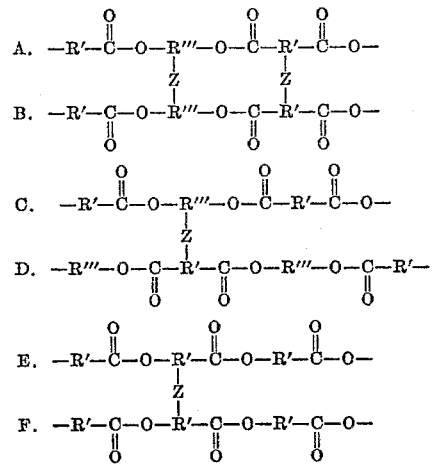

A and B both represent segments of two polyester molecules in which R' and R''' are divalent hydrocarbon groups as indicated above for the linear aliphatic saturated polyesters. Where the two molecules are crosslinked through the R''' groups, hydrolysis will produce a tetrahydroxy compound. Similarly, where the crosslinkage is through the R' groups, hydrolysis produces a tetracarboxylic acid compound. Accordingly, where the polyethylene glycol sebacate-divinyl benzene irradiated product of Example I is used and the crosslinkages are as in A and B, then the saponification products include bis-(dihydroxybutyl)-benzene and bis-(1,8-dicarboxy-octyl-ethyl)-benzene.

Such saponification products can be represented generally by the following formulas with the various symbols as previously indicated:

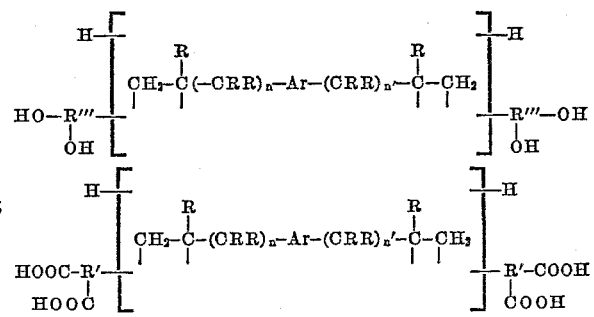

With polymer segments C and D where the crosslinkage is shown between an R' and an R''' group, the product upon hydrolysis is a dihydroxy-dicarboxylic acid. When this type of crosslinkage exists in the product of Example I, then the saponification products include dihydroxybutyl-dicarboxydecyl-benzene.

Such saponification products can be represented generally by the following formula with the various symbols as previously indicated:

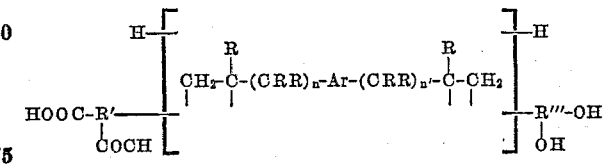

With polymer segments E and F representing parts of a polyester made from an hydroxycarboxylic acid, the hydrolysis products include dihydroxy-dicarboxylic acids. Accordingly when the product of Example V is used, the saponification products include bis-(1-hydroxy-9-carboxy-nonyl-ethyl)-benzene.

Such saponification products can be represented generally by the following formula with the various symbols as previously indicated.

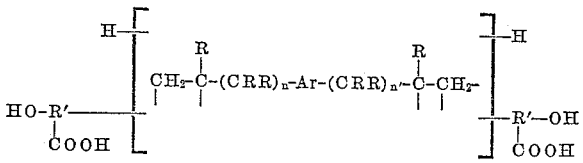

Therefore, it can be seen that the foregoing permits the production of various polyfunctional hydroxy and carboxylic acid compounds. This is surprising and especially important in view of the fact that when the corresponding monomeric hydroxy and carboxylic acid compounds are irradiated directly, the monomers generally decompose and do not give the polyfunctional derivatives illustrated above. It is not intended, however, that the invention be restricted to the specific products or linkages or theories indicated above. It is contemplated that the invention covers whatever products are obtained by the practice taught herein regardless of the exact chemical structure. The foregoing is merely illustrative of the possibilities of the invention.

The hydrolysis can be carried out on any of the irradiated resins produced according to any of the foregoing examples. A suitable procedure is illustrated by the following examples:

EXAMPLE VII

Potassium hydroxide is dissolved in alcohol—the amount of KOH being slightly in excess of the stoichiometric amount calculated on the basis of the amount of resin to be hydrolyzed. The resin advantageously in powder or flake form and the alcoholic solution are placed in equipment provided with stirrer and reflux condenser. The mixture is stirred and refluxed for about half an hour after the resin has gone into solution. The resultant solution contains the hydroxy derivatives and the potassium salt of the carboxylic acids. The solution is concentrated by distilling off some of the alcohol and the hydroxy and carboxylic acid derivatives separated by various means such as neutralization, distillation, crystallization, extraction, etc.

EXAMPLE VIII

When the irradiated resins of Examples I–VI inclusive are individually hydrolyzed by the procedure of the preceding example and sufficient hydrochloric acid added in each case to react with the potassium present in the product, followed by atmospheric distillation of the volatile materials present and subsequent distillation at reduced pressure, distillates of wide boiling range are obtained in each case. Various fractions of these distillates give tests indicating the presence of hydroxy and carboxylic acid groups.

The compositions produced according to the preceding two examples are particularly useful in the preparation of modified drying oil compositions, wetting agents, detergents, sequestering agents, etc., and are used in the manner in which such products are generally used. As previously indicated herein the irradiated polymeric materials produced by the invention disclosed herein, including those containing various modifiers as described, are useful in the production of textile fibers, packaging film, protective coatings and other shaped articles of improved properties such as improved heat and solvent resistance, which fibers, films, etc., are advantageously used in the manner and for the purposes in which such products are generally used.

The amount of polyunsaturated modifier to be added will vary depending on the properties desired in the ultimate product. As would be expected, the greater the amount of such compound used, the greater is the change in properties of the irradiated product. Although even as little as 0.1 percent of polyunsaturated compound often effects notable changes in properties, it is generally advantageous to have at least one percent or more of such modifiers present. There is no upper limit to the proportion of such compound that may be present. However, when there is more than fifty percent present, the properties of the products approach those of polymers obtained by irradiation of the modifiers alone. Therefore, to retain characteristics of the polymeric olefin, it is desirable to have no more than fifty percent by weight of the modifier. However, in cases where the irradiated product is to be saponified for recovery of the type of products indicated herein, the proportion of modifier is adjusted according to the yield desired for such products, and, especially in cases where the molecular weight of the polyunsaturated modifier is considerably more than the molecular weight of the polymer unit which will be liberated by saponification, then it may be desirable to have greater proportions than fifty percent by weight of the modifier present.

While certain features of this invention have been described in detail with respect to various embodiments thereof, it will, of course, be apparent that other modifications may be made within the spirit and scope of this invention and it is not intended to limit the invention to the exact details shown above except insofar as they are defined in the following claims.

The invention claimed is:

1. A process for producing improved polyester resin compositions comprising the treatment of a linear, saturated aliphatic polyester having ester groups in the linear polymer chains thereof and having at least two carbon atoms between ester groups in the polymer molecule with at least about 2 megareps of irradiation while said polyester is in intimate and substantially uniform mixture with at least 0.1 percent by weight, based on the weight of said polyester resin, of a polyalkenyl aryl compound of the formula $$CH_2=CR-(CRR)_n-Ar-(CRR)_{n'}-CR=CH_2$$

wherein each R is respectively selected from the class consisting of hydrogen and methyl and ethyl groups; $n$ and $n'$ are each values selected from the class consisting of 0, 1 and 2; and Ar is an aryl nucleus, said irradiation being high energy, ionizing radiation equivalent to at least 100,000 electron volts.

2. A process of claim 1 in which at least 1 percent of said polyalkenyl aryl compound is used.

3. A process of claim 2 in which said polyalkenyl aryl compound is a divinyl aryl hydrocarbon.

4. A process of claim 2 in which said polyalkenyl aryl compound is divinyl benzene.

5. A process of claim 2 in which the irradiated product is subsequently saponified.

6. A process of claim 1 in which said polyester has a molecular weight of at least 3,000.

7. A process of claim 1 in which the irradiated product is subsequently saponified.

8. A process of claim 1 in which said polyester is polymeric ethylene glycol sebacate.

9. A process of claim 1 in which said polyester is polymeric tetramethylene glycol adipate.

10. A process of claim 1 in which said polyester is derived from a dihydroxy alkane and a dicarboxylic alkane.

11. A process of claim 1 in which said polyester resin is prepared from a hydroxy alkanoic acid.

12. A process of claim 1 in which said polyester is derived from omega-hydroxy-decanoic acid.

13. A process of claim 1 in which said polyester is polymeric hexamethylene glycol adipate.

References Cited in the file of this patent

UNITED STATES PATENTS

| | | |
|---|---|---|
| 2,155,590 | Garvey | Apr. 25, 1939 |
| 2,567,719 | Loritsch et al. | Sept. 11, 1951 |
| 2,666,025 | Nozaki | Jan. 12, 1954 |
| 2,666,042 | Nozaki | Jan. 12, 1954 |
| 2,670,483 | Brophy | Mar. 2, 1954 |
| 2,700,185 | Lee | Jan. 25, 1955 |
| 2,785,383 | Foster | Mar. 12, 1957 |
| 2,837,496 | Vandenberg | June 3, 1958 |
| 2,843,562 | Caldwell | July 15, 1958 |
| 2,917,484 | Kray et al. | Dec. 15, 1959 |
| 2,921,006 | Schmitz et al. | Jan. 12, 1960 |

FOREIGN PATENTS

| | | |
|---|---|---|
| 679,562 | Great Britain | Sept. 17, 1952 |
| 499,577 | Canada | Jan. 26, 1954 |
| 1,079,401 | France | May 19, 1954 |
| 66,034 | France | Dec. 12, 1955 |
| | (4th addition to No. 1,079,401) | |

OTHER REFERENCES

Bopp et al.: ORNL 1373, July 23, 1953, pages 32, 64 and 68–70.

Ballantine et al.: "Brookhaven National Laboratory Report No. 389," pp. 6–11, May 1956.

Ballantine et al.: "Brookhaven National Laboratory Report No. 414," pp. 1–5, October 1956.

Brookhaven National Laboratory Report 375, p. 26, April 1956.

Bovey: "Effects of Ionizing Radiation on Natural and Synthetic High Polymers," pp. 173–176 (1958).